(12) United States Patent
Hellin et al.

(10) Patent No.: US 9,229,300 B2
(45) Date of Patent: Jan. 5, 2016

(54) POSITION ADJUSTMENT SYSTEM FOR A PROJECTION LENS

(75) Inventors: Frank Hellin, Heule (BE); Daniel Lambot, Leuze-en-Hainaut (BE)

(73) Assignee: Barco N.V., Kortrijk (BE)

( * ) Notice: Subject to any disclaimer, the term of this patent is extended or adjusted under 35 U.S.C. 154(b) by 143 days.

(21) Appl. No.: 13/811,329

(22) PCT Filed: Jul. 26, 2011

(86) PCT No.: PCT/EP2011/062830
§ 371 (c)(1),
(2), (4) Date: Jan. 21, 2013

(87) PCT Pub. No.: WO2012/013675
PCT Pub. Date: Feb. 2, 2012

(65) Prior Publication Data
US 2013/0120720 A1    May 16, 2013

(30) Foreign Application Priority Data

Jul. 26, 2010 (GB) .................................. 1012457.6

(51) Int. Cl.
| G03B 21/14 | (2006.01) |
| G02B 7/02 | (2006.01) |
| G03B 5/06 | (2006.01) |

(52) U.S. Cl.
CPC .............. *G03B 21/142* (2013.01); *G02B 7/021* (2013.01); *G02B 7/023* (2013.01); *G02B 7/026* (2013.01); *G03B 5/06* (2013.01); *G03B 21/14* (2013.01); *G03B 2205/0092* (2013.01)

(58) Field of Classification Search
CPC ......... G02B 7/02; G02B 7/023; G03B 21/142
USPC .............. 353/69, 70, 100, 101; 359/694, 702, 359/703, 811, 819
See application file for complete search history.

(56) References Cited

U.S. PATENT DOCUMENTS 3,262,360 A * 7/1966 Gruner et al. ................. 359/818
4,771,302 A   9/1988 Hamada
(Continued)

FOREIGN PATENT DOCUMENTS

| CN | 201237662 | 5/2009 |
| DE | 102004008072 | 10/2005 |

(Continued)

OTHER PUBLICATIONS

International Search Report for corresponding patent application No. PCT/EP2011/062830 dated Nov. 25, 2011.

(Continued)

*Primary Examiner* — William C Dowling
(74) *Attorney, Agent, or Firm* — Renner, Otto, Boisselle & Sklar, LLP

(57) ABSTRACT

A lens position adjustment system (10) permits adjustment of the position of a projection lens (5) relative to a projector (100) for making a Scheimpflug adjustment. The projection lens (5) has an optical axis (6). The system (10) comprises: a first support part (20) for fitting to, or forming part of, the projector (100); a second support part (40) for fitting to, or forming part of, the projection lens (5); and a connecting part (30). The connecting part (30) is pivotally connected to the first support part (20) and pivotally connected to the second support part (40) and configured to permit independent adjustment of the second support part (40) relative to the first support part (20) about two axes of rotation (7, 8) which intersect, and are perpendicular to, the optical axis (6) of the projection lens (5). A locking mechanism (28, 29, 51-58) is provided for securing a position of the second support part (40) relative to the first support part (20).

14 Claims, 16 Drawing Sheets

(56) References Cited

U.S. PATENT DOCUMENTS

| | | | | |
|---|---|---|---|---|
| 5,194,993 | A | * | 3/1993 | Bedzyk ................ 359/813 |
| 5,250,968 | A | * | 10/1993 | Numata et al. ............ 353/101 |
| 5,289,215 | A | | 2/1994 | Clairmont |
| 6,966,657 | B2 | * | 11/2005 | Van De Velde et al. ...... 353/101 |
| 7,164,546 | B2 | * | 1/2007 | Miyashita et al. ........... 359/813 |
| 7,922,343 | B2 | * | 4/2011 | Lee et al. ................. 353/101 |
| 8,038,307 | B2 | * | 10/2011 | Kitahara et al. ............ 353/101 |
| 8,366,280 | B2 | * | 2/2013 | Tseng .................... 353/100 |
| 2002/0154278 | A1 | * | 10/2002 | Masuda ................... 353/101 |
| 2005/0110447 | A1 | | 5/2005 | Weber et al. |
| 2008/0198340 | A1 | * | 8/2008 | Tsai et al. ................ 353/100 |
| 2009/0201595 | A1 | | 8/2009 | Matsumoto |
| 2011/0051103 | A1 | * | 3/2011 | Tseng .................... 353/101 |
| 2014/0313492 | A1 | * | 10/2014 | Matsui et al. ............. 353/101 |

FOREIGN PATENT DOCUMENTS

| | | |
|---|---|---|
| EP | 1566677 | 8/2005 |
| KR | 1020090086755 | 8/2009 |

OTHER PUBLICATIONS

Written Opinion for corresponding patent application No. PCT/EP2011/062830 dated Nov. 25, 2011.

International Preliminary Report on Patentability for corresponding patent application No. PCT/EP2011/062830 dated May 29, 2011.

Chinese Office Action for corresponding Chinese patent Application No. 201180036167.8 dated Dec. 1, 2014. (Includes English Translation).

First Examination Report for corresponding British Patent Application No. GB1012457.6, mailed on Apr. 14, 2015.

Second Chinese Office Action for corresponding Chinese patent Application No. 201180036167.8 dated Jun. 9, 2015. (Includes English Translation).

\* cited by examiner

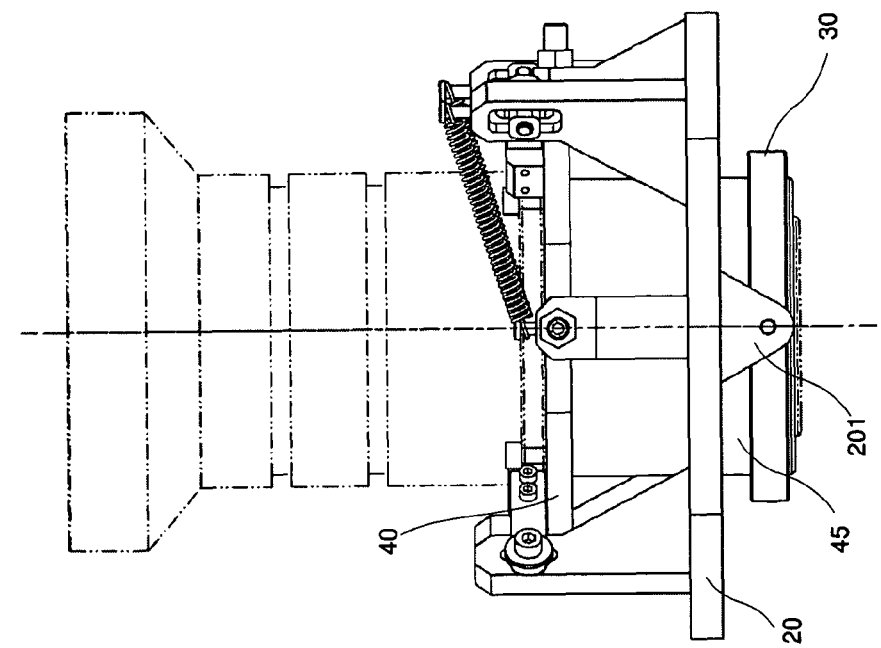
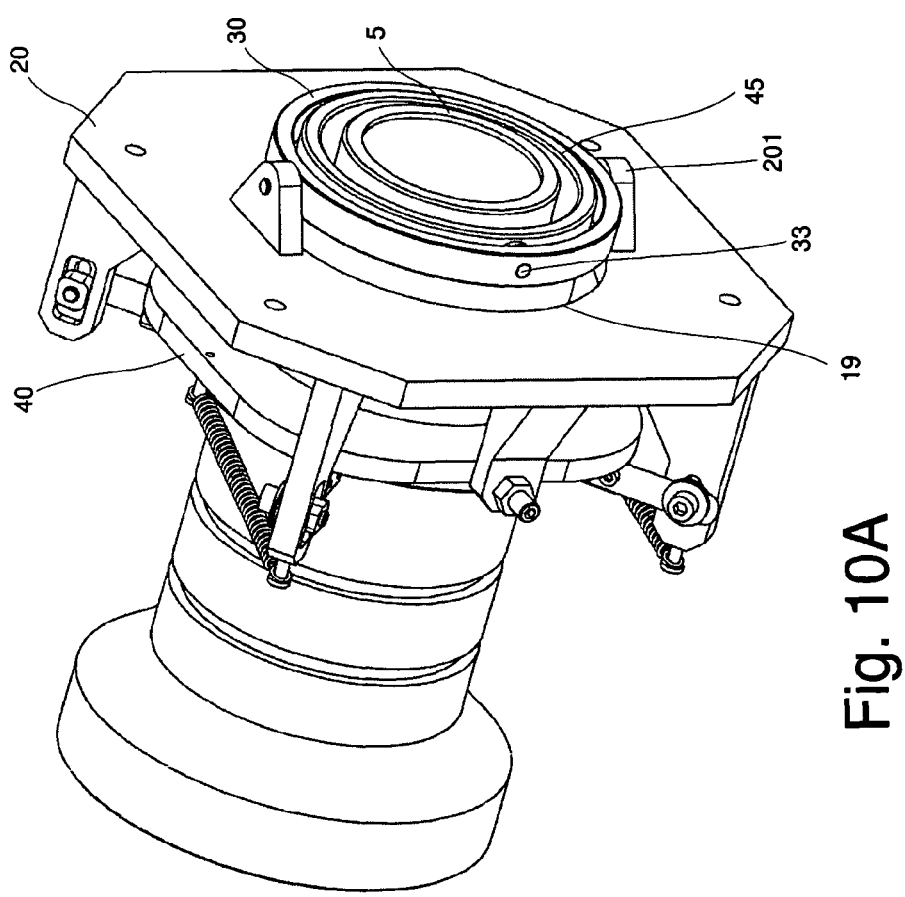
Fig. 10A
Fig. 10B

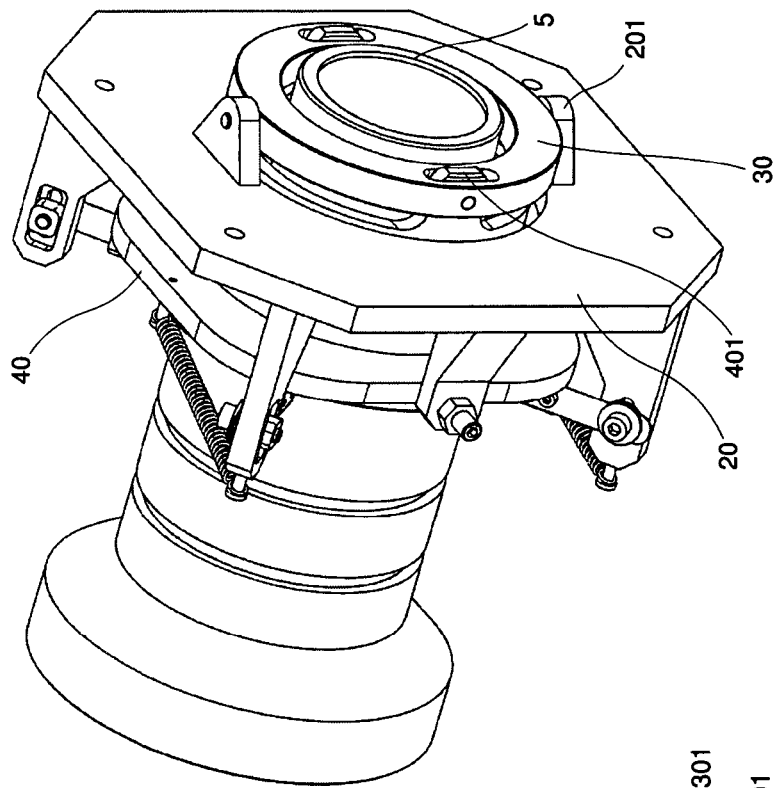
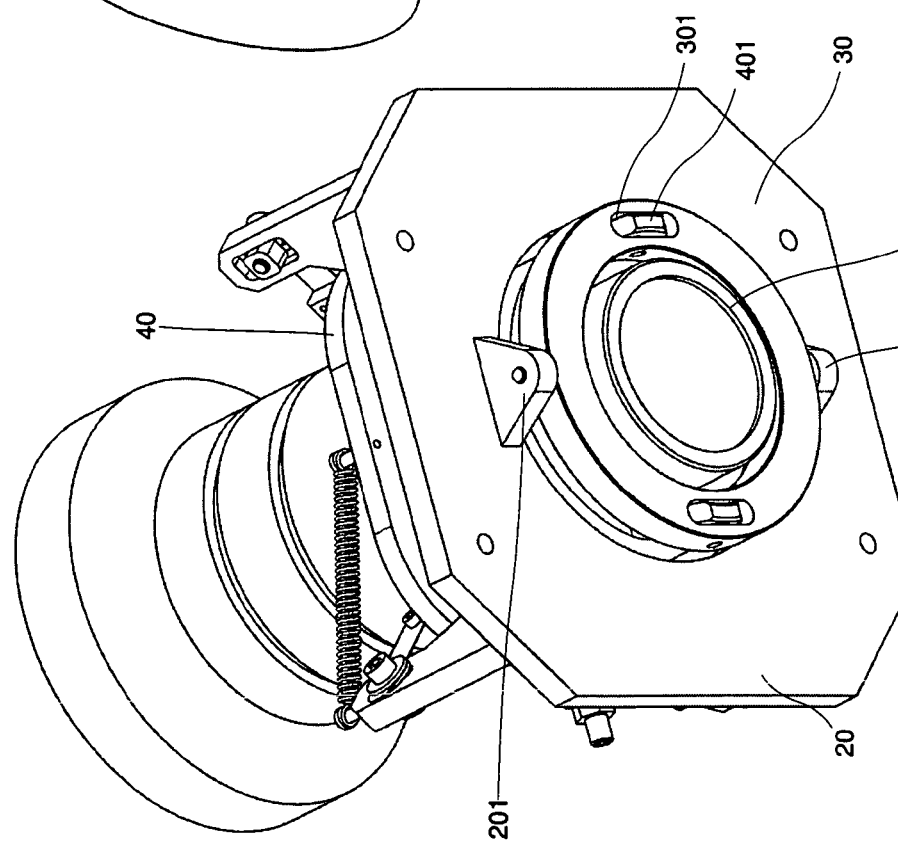

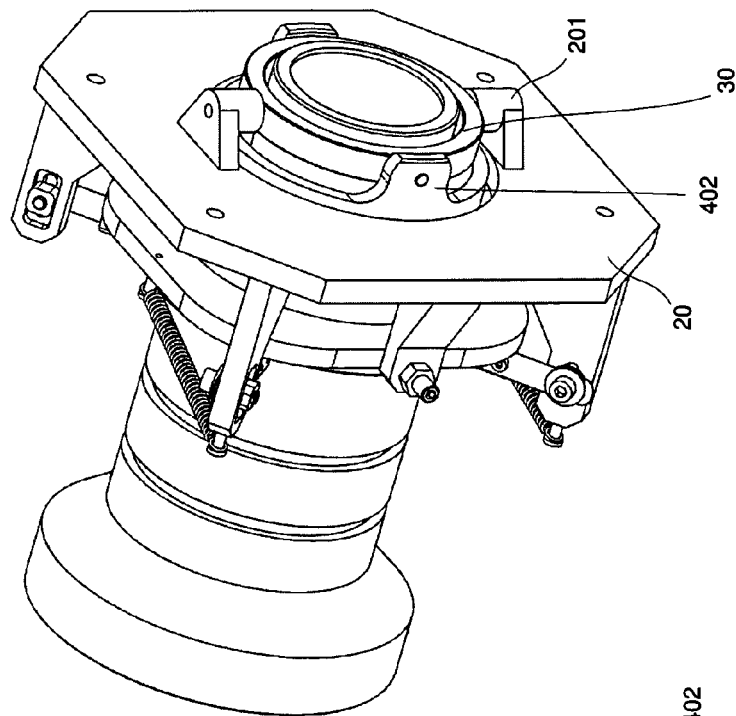
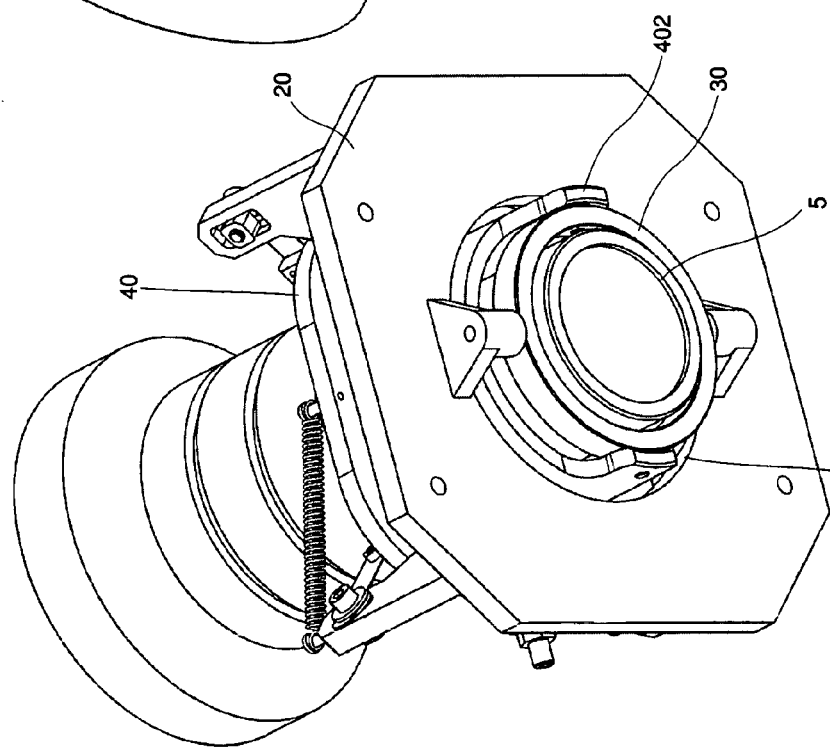

POSITION ADJUSTMENT SYSTEM FOR A PROJECTION LENS

This application is a national phase of International Application No. PCT/EP2011/062830 filed Jul. 26, 2011 and published in the English language.

FIELD OF THE INVENTION

This invention relates to a position adjustment system for a projection lens of a projection system which permits a Scheimpflug adjustment as well as to methods of constructing and operating such a projection system and to a lens adapter for such a system.

BACKGROUND TO THE INVENTION

When a projection system projects an image onto a screen, the projected image can be out of focus, or partially out of focus, if the screen is not positioned perpendicular to the main optical axis of the projection system. This is a particular problem in systems using facetted or curved projection screens where the screen-forming elements can be angularly offset with respect to the optical axis of the projection system.

It is possible to correct this focus error without the need to reposition the screen and/or projector. The position of the projection lens can be adjusted with respect to the projector. This solution is generally known as the "Scheimpflug principle". The action performed on the projection lens itself is called Scheimpflug adjustment or correction.

One approach to Scheimpflug adjustment in a projection system uses an adjustment system comprising a carrier plate connected to the projection lens and a base plate connected to the projector. The carrier plate can be rotated with respect to the base plate about a horizontal rotation axis positioned above the lens and the carrier plate can be rotated with respect to the base plate about a vertical axis positioned at the side of the lens. Adjustment bolts and compression springs connect the carrier plate and base plate. However, tilting the projection lens also defocuses it strongly. This requires refocusing of the lens by moving the lens carrier plate along the Z-axis by adjusting all three of the bolts by exactly the same amount. The focus (or back focal length) and tilt (or Scheimpflug) adjustments are combined, typically requiring iterative adjustment until a satisfactory combination of Scheimpflug correction and focus is achieved.

Another approach to Scheimpflug adjustment in a projection system uses ball-joint or spherically-shaped joints between a carrier plate connected to the projection lens and a fixed plate connected to the base plate or X-Y position adjustment mechanism. A spherically-shaped carrier plate can rotate within a spherically-shaped base plate. It can be difficult to make a smooth adjustment with this arrangement as it is a friction-based solution with undesirable stick-slip effects. Also, it is difficult to lock the position of the projection lens after adjustment. This solution is also expensive because of the smooth curved surfaces needed. Accordingly, this solution is not suitable for heavy projection lenses.

Another approach to Scheimpflug adjustment in a projection system is described in EP 1 566 677A1. A projection lens is mounted on a base plate. The position of the projection lens can be adjusted by applying horizontal and/or vertical shifts in a plane perpendicular to the optical axis of the projection lens. The projection lens can also be tilted to provide Scheimpflug adjustment.

SUMMARY OF THE INVENTION

It is an object of the present invention to provide a position adjustment system for a projection lens of a projection system which permits a Scheimpflug adjustment as well as a method of constructing and operating such a projection system and a lens adapter for such a system.

An aspect of the invention provides a lens position adjustment system for adjusting the position of a projection lens relative to a projector for making a Scheimpflug adjustment, the projection lens having an optical axis, the system comprising:

a first support part for fitting to, or forming part of, the projector;

a second support part for fitting to, or forming part of, the projection lens;

a connecting part pivotally connected to the first support part and pivotally connected to the second support part and configured to permit independent adjustment of the second support part relative to the first support part about two axes of rotation which intersect, and are perpendicular to, the optical axis of the projection lens.

The lens position adjustment system can be constructed as a lens-projector adapter.

Arranging that both axes of rotation intersect and are perpendicular to the optical axis of the lens has an advantage that a rotation around these axes will have little effect onto the lens back focal length (BFL) setting. Because of the effect on the BFL is very little, there is no need to re-adjust the BFL setting while/after altering the Scheimpflug adjustment. A small BFL variation, which will cause a small de-focus effect on the image, can easily be corrected with the lens focus. This allows an easy and very quick adjusting method. Advantageously, the two axes of rotation are chosen near a nodal point of the projection lens, which further reduces the effect on the image position when making a Scheimpflug adjustment.

Embodiments of the invention have advantages of allowing an easy and quick Scheimpflug adjustment. An independent adjustment of the Scheimpflug correction can be made about each of the two rotation axes. The adjustment system is compact and lightweight and is relatively inexpensive to manufacture. The adjustment system has little, or no, effect on general image focus and has little, or no, effect on image position. A further advantage is that the pivotal mounting provides a low-friction adjustment of the lens position allowing small, accurate, adjustments of lens position without the stick-slip problem of the prior art system.

Advantageously, the system comprises a locking mechanism for securing a position of the second support part relative to the first support part. The locking mechanism provides a secure locking of the adjusted position of the projection lens, and can cope with heavy projection lenses.

Advantageously, the locking mechanism is arranged to secure the second support part to the first support part. Advantageously, the locking mechanism comprises at least one locking device located at a position which is offset from the axes of rotation. Advantageously, the locking mechanism comprises a plurality of locking devices positioned around the periphery of the second support part. Advantageously, there are at least three, and advantageously at least four, locking devices positioned around the periphery of the second support part. Advantageously the, or each, locking device comprises an elastically resilient member, such as a cantilever spring.

The position adjustment system can be used in a range of projection applications. Applications which have a particular need for Scheimpflug adjustment are simulation or augmented reality applications where facetted or curved projection screens are used.

A further aspect of the invention provides a projector including the lens position adjustment.

A further aspect of the invention provides a method of adjusting the position of a projection lens relative to a projector for making a Scheimpflug adjustment, the projection lens having an optical axis, the method comprising pivoting the projection lens with respect to the projector using a gimbal that permits independent adjustment of the lens orientation relative to the projector orientation about two axes of rotation which intersect, and are perpendicular to, the optical axis of the projection lens.

BRIEF DESCRIPTION OF THE DRAWINGS

Embodiments of the invention will be described, by way of example only, with reference to the accompanying drawings in which:

FIGS. 10A to 10C show an embodiment of the lens position adjustment system with the connecting part located behind the back plate;

FIGS. 12A and 12B show an embodiment of the lens position adjustment system with the carrier plate connecting to the connecting part using a recess in the connecting part;

FIGS. 13A to 13C show an embodiment of the lens position adjustment system with the carrier plate connecting on the outside of the connecting part.

DESCRIPTION OF PREFERRED EMBODIMENTS

Figure 1:
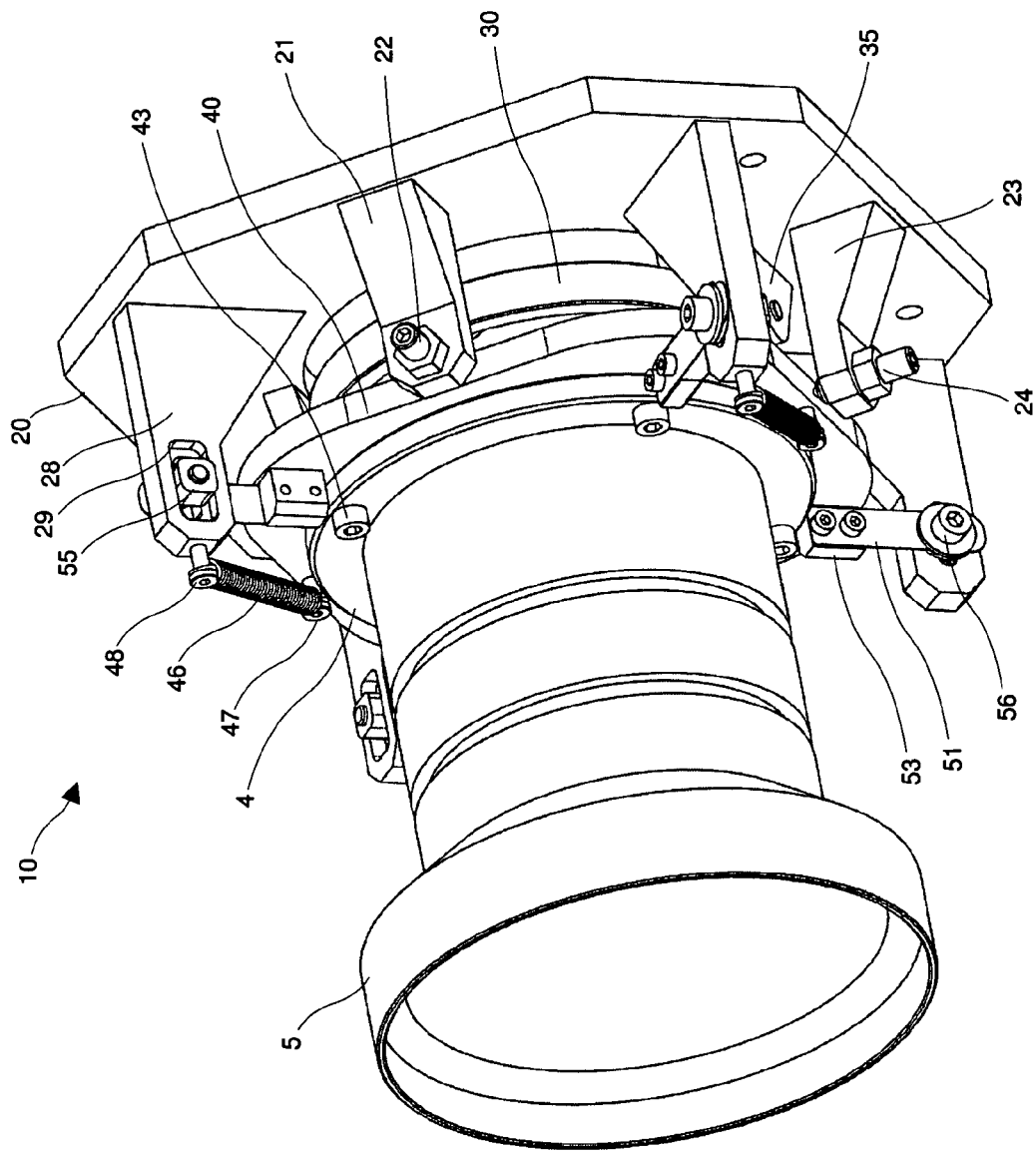
FIG. 1 shows a lens position adjustment system in an assembled state, mounted to a projection lens.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 2:
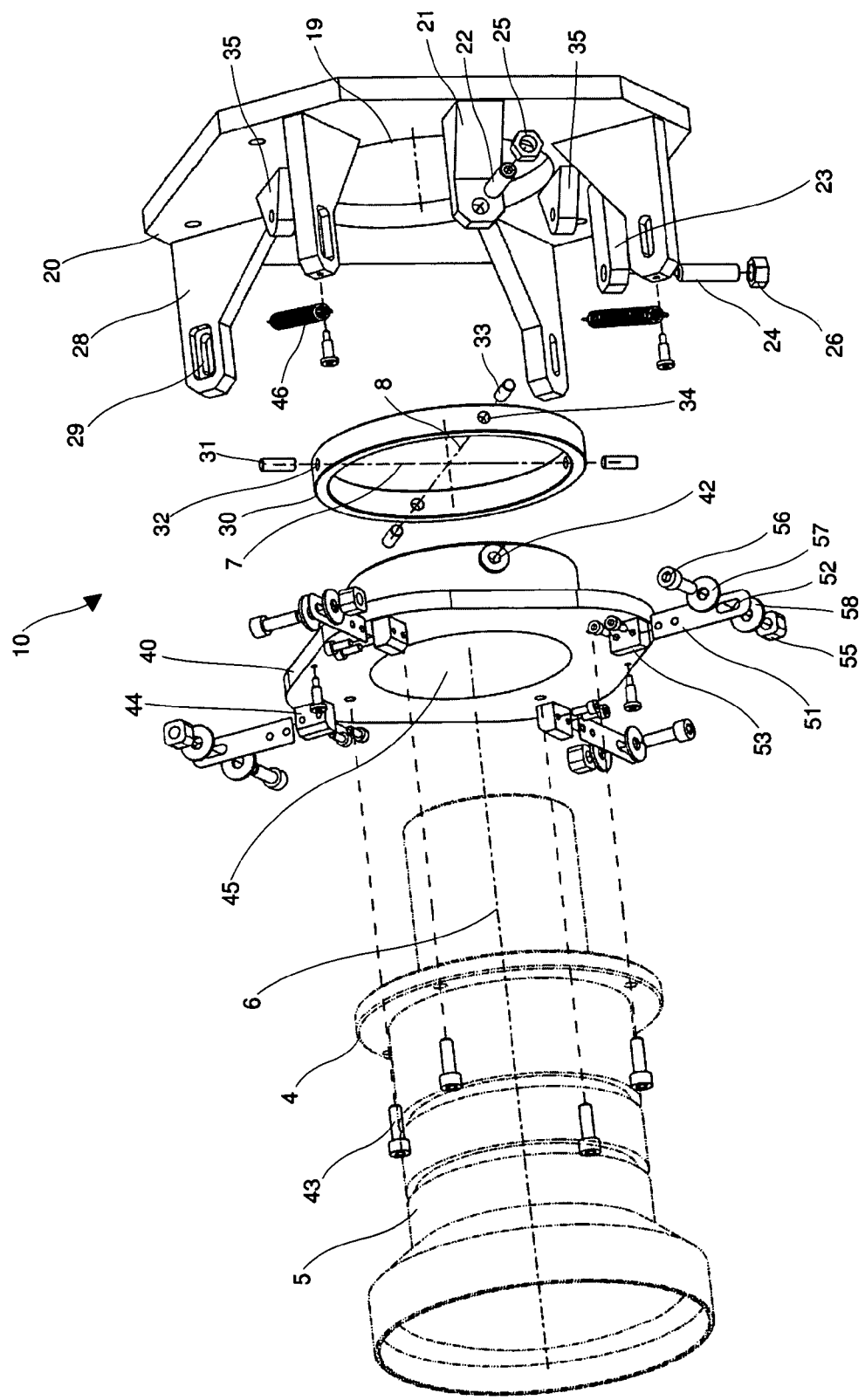
FIG. 2 shows an exploded view of the lens position adjustment system.
Figure 3:
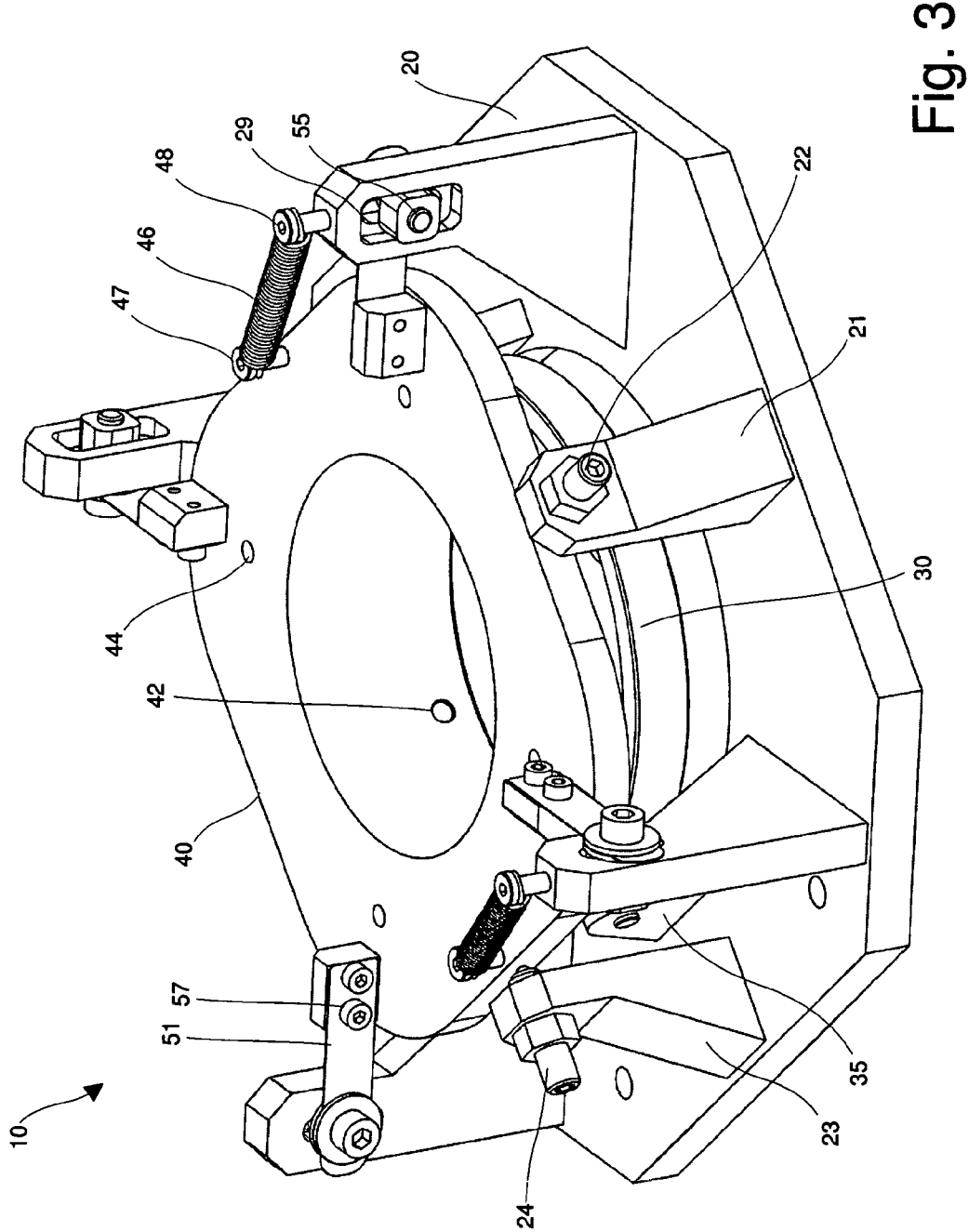
FIG. 3 shows the lens position adjustment system in an assembled state, with the projection lens removed.
Figure 4:
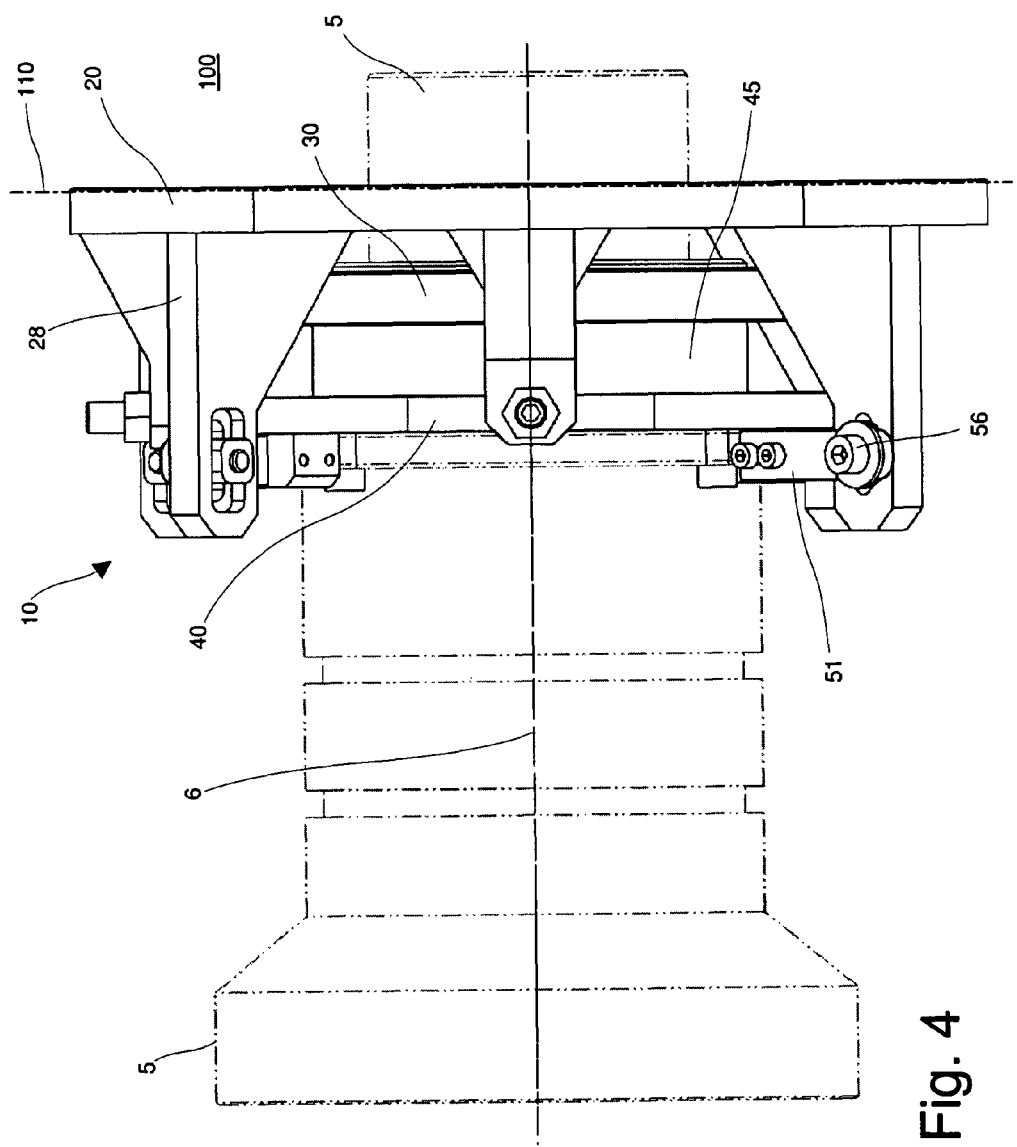
FIG. 4 shows a side view of the lens position adjustment system.

FIGS. 1 to 4 show a lens position adjustment system 10 for adjusting the position of a projection lens 5 relative to a projector according to an embodiment of the invention. FIGS. 1 and 4 show the lens position adjustment system in an assembled state, mounted to a projection lens 5. FIG. 2 shows an exploded view of the lens position adjustment system. FIG. 3 shows the lens position adjustment system in an assembled state, with the projection lens removed. The lens position adjustment system can be constructed as a lens-projector adapter.

The main components of the lens position adjustment system are a first support part 20 (which will be called a base plate), a second support part 40 (which will be called a carrier plate) and a connecting part 30. The base plate 20 is mountable to, or can form part of, a chassis of a projector or projection system (100, FIG. 4). Carrier plate 40 is mountable to a projection lens 5. Carrier plate 40 has a tubular part 45 for receiving the barrel of a lens. The projection lens 5 is secured to the carrier plate 40 by screws or bolts 43 which pass through a flanged part 4 of the lens 5 and locate in holes 44 in the carrier plate 40. In an alternative embodiment, the carrier plate 40 can form an integral part of the lens 5.

Base plate 20 is mountable to a chassis 110 (FIG. 4) of a projector or projection system 100. Base plate 20 has a set of supports 28 protruding outwardly from the base plate 20 in the direction of the optical axis 6. In an advantageous embodiment there are four supports 28 each offset by 90° from an adjacent support 28. Each support 28 has a slot 29 at the distal end of the support 28. Each slot 29 forms part of a locking mechanism for securing the position of the lens 5. The slot 29 has a longitudinal axis which is perpendicular to the plane of the base plate 20. Base plate 20 also has a pair of supports 35 positioned diametrically opposite one another on the base plate. Supports 35 are aligned with the nominal optical axis 6 of the projection lens (i.e. the axis before any Scheimpflug adjustment.) Supports 35 provide support for the connecting part 30. Base plate 20 also has two legs 21, 23 protruding outwardly from the base plate 20. Each leg 21, 23 has a hole for receiving a respective adjusting screw 22, 24 for adjusting the position of the carrier plate 40. Base plate 20 has an aperture 19 which allows (if required) a barrel of a lens 5 to project through the base plate 20, as shown in FIG. 4.

In this embodiment, connecting part 30 is a ring-shaped part with a pair of diametrically opposed holes 32. Connecting part 30 is pivotably connected to supports 35 by pins 31. In use, connecting part 30 can be rotated about a rotation axis 7. Connecting part 30 also has a pair of diametrically opposed holes 34 and is pivotably connected to a pair of diametrically opposed holes 42 in carrier plate 40 by pins 33. In use, carrier plate 40 can be rotated with respect to the connecting part 30 about an axis 8. Axes 7, 8 are perpendicular to one another and are perpendicular to a (longitudinal) optical axis 6 of the projection lens. Axes 7, 8 intersect with one another at the optical axis 6.

Leg 21 and adjustment screw 22 are positioned perpendicularly to the rotational axis 7. In use, turning adjusting screw 22 in one direction (e.g. clockwise) causes a tip 27 of the screw 22 to press against a side face of the carrier plate 40 and causes the carrier plate 40 to move in one direction about rotational axis 7. Turning adjusting screw 22 in the opposite direction (e.g. anti-clockwise) causes a tip 27 of the screw 22 to move away from the carrier plate 40 and allows the carrier plate 40 to move in the opposite direction about rotational axis 7. In a similar manner, leg 23 and adjustment screw 24 are positioned perpendicularly to the rotational axis 8. In use, turning adjusting screw 24 in one direction (e.g. clockwise) causes a tip 27 of the screw 24 to press against the carrier plate 40 and causes the carrier plate 40 to move in one direction about rotational axis 8. Turning adjusting screw 24 in the opposite direction (e.g. anti-clockwise) causes a tip 27 of the screw 24 to move away from the carrier plate 40 and allows the carrier plate 40 to move in the opposite direction about rotational axis 8. In the orientation shown in FIG. 2, rotation axis 7 is a vertical axis and rotation axis 8 is a horizontal axis. In use, the large mass of the projection lens provides a suitable moment about the rotation axis 8 to cause the carrier plate 40 to move about the rotation axis 8, and thus ensuring continuous contact with the tip of screw 24, when the screw 24 is turned so that it moves away from the carrier plate 40. The vertical rotation axis 7 does not benefit in the same way. An elastically resilient element (e.g. a compression spring 46) can be provided which acts between the carrier plate 40 and base plate 20 and exerts a moment in a direction about axis 7. This assists movement of the carrier plate 40 when adjustment screw 22 is turned so that it moves away from the carrier plate 40. FIG. 1 and FIG. 3 show one way of mounting the resilient elements. Two compression springs 46 are provided, one on each side of the carrier plate 40. Conveniently, one spring 46 is positioned on a part of the carrier plate 40 which, in use, will be on top and one spring 46 is positioned on a part of the carrier plate 40 which, in use, will be on the bottom. One eye of each spring is connected to a post 47 mounted on the front surface of carrier plate 40, near the vertical middle and outer edge of the carrier plate 40. This position maximises the mechanical moment exerted by the spring. The other eye of each spring is connected to a post 48 mounted on the base plate 20.

The purpose of the nut 25, 26 on each of the adjusting screws is to lock the adjusting screws onto the base plate 20 so that these adjusting screws do not work loose and are not lost. When the nuts 25, 26 are fastened, the adjusting screws 22, 23 are prevented from rotating, thereby preventing any change to the Scheimpflug adjustment. Alternatively, once locked, the adjusting screws 22, 23 could be removed. The tip 27 of each adjustment screw 22, 24 can be rounded. In use, the tip 27 touches a side face of the carrier plate 40. During use, the side face does not remain perpendicular to the rotation axis of the adjustment screw 22, 24. Depending on the Scheimpflug setting, the side faces can have a double inclination. A ball-shaped tip 27 ensures a well-defined point of contact between the tip 27 and the side face of the carrier plate. In an alternative embodiment, the screws 22, 24 are setscrews comprising a ball insert that contains a flat surface for pressing against a face of the carrier plate 40. The ball insert can rotate inside the setscrew and follows the inclination of the side plate. During adjustments, the contact surface also slides over the side face of the carrier plate 40. This can reduce high contact pressure and wear.

Figure 6:
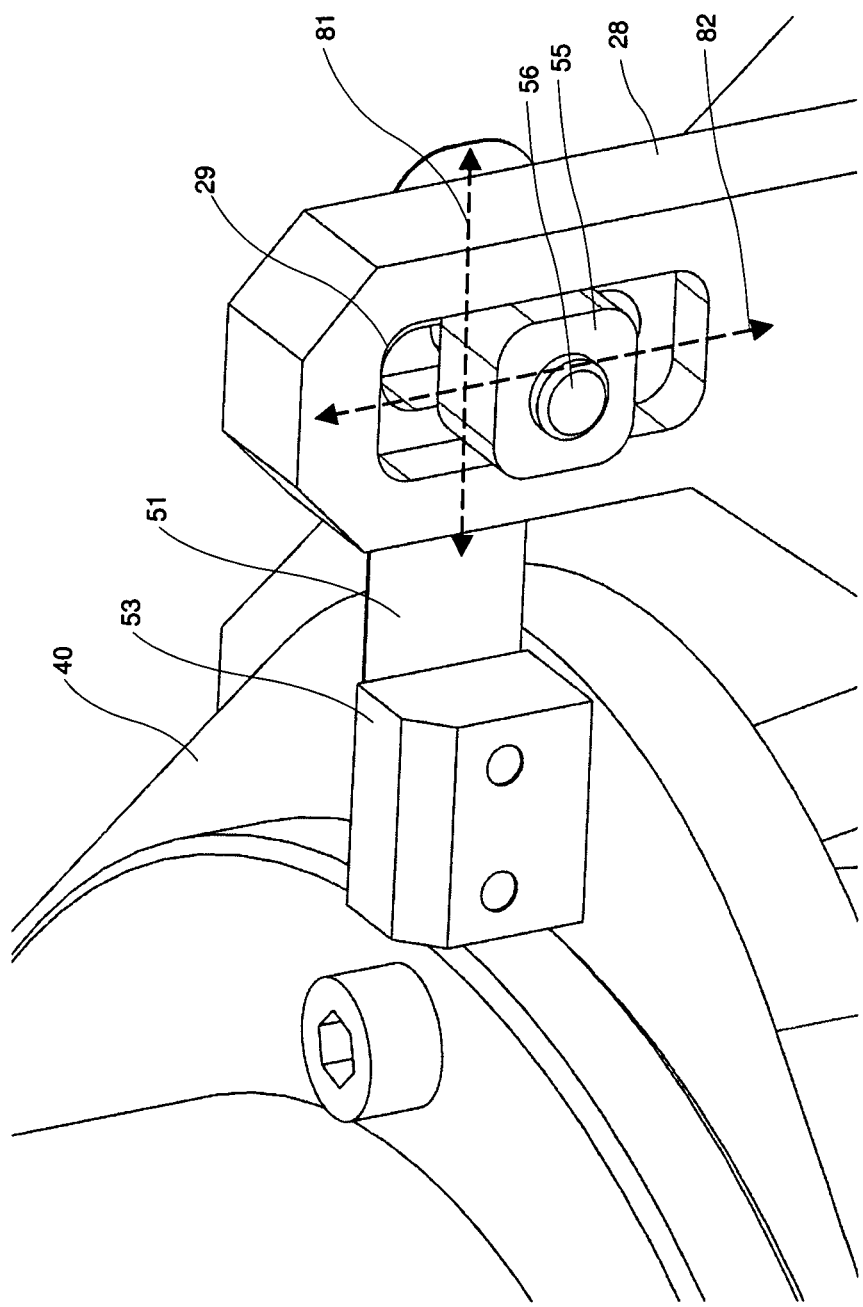
FIGS. 6 and 7 show the locking mechanism in detail.

A locking mechanism is provided for securing the (adjusted) position of the carrier plate 40 relative to the base plate 20. The locking mechanism acts directly between the carrier plate 40 and base plate 20. In the embodiment shown in FIGS. 1 to 3, the locking mechanism comprises four locking devices. Each locking device comprises an elongate member 51. Each member 51 is connected to a respective corner of the carrier plate 40 and is directed radially outwards from the carrier plate 40. The members 51 form a circular array with the members being spaced apart by 90°. Advantageously, each member 51 is an elastically resilient member such as a cantilever spring. Each member 51 is secured to a mounting block 53 on the carrier plate 40 by bolts 54. Each member 51 has a slot 52. The slot 52 is aligned with the longitudinal axis of the member 51 and is radially aligned with respect to the carrier plate 40. Each member 51 of the locking mechanism also comprises a bolt 56, nut 55 and washers 57, 58 for securing the member 51 to a support arm 28 of the base plate 20. As best shown in FIG. 6, each nut 55 locates in a slot 29 of a support 28 of the base plate 20. During adjustment of the lens position, nuts 55 of members 51 can move along respective slots 29.

The lens position adjustment system 10 allows independent adjustment (correction) of Scheimpflug about two axes of rotation 7, 8. The connecting part 30 is pivotally connected to base plate 20 about a rotation axis 7. The carrier plate 40 is pivotally connected to connecting part 30 about a rotation axis 8. Axes 7, 8 are perpendicular to one another. Advantageously, one axis is horizontally aligned and the other axis is vertically aligned. The adjustment of lens position is a low-friction movement, as the connecting part due to the pivotal mounts. The arrangement described above functions in a similar manner to a universal joint or a gimbal. The position of the axes of rotation 7, 8 with respect to the lens nodal point(s) can be constructed to any chosen position depending on the lens type to be used. Scheimpflug adjustment in the vertical and horizontal plane can be carried out independently.

Because both axes of rotation 7, 8 are intersecting and perpendicular to the optical axis 6 of the lens, a rotation around these axes will have little effect onto the lens back focal length (BFL) setting. Because the effect on the BFL is very little, there is no need to re-adjust the BFL setting while/after adjusting the Scheimpflug. A small BFL variation, which will cause a small de-focus effect on the image, can easily be corrected with the lens focus. This allows an easy and very quick adjusting method. When the two axes of rotation 7, 8 are chosen near a nodal point of the projection lens, a Scheimpflug adjustment has very little effect on the image position.

The projector/projection system 100 comprises image-forming apparatus and can be of any conventional design. Typically, the projector 100 comprises a light source and a light valve array. The light valve array comprises a two-dimensional array of light valve elements. Each light valve element corresponds to a pixel of the image and can be individually controlled to allow an amount of light to pass through/be reflected from that element. Typically, each light valve element is controlled across arrange of values (e.g. 256) between 'on' and 'off' to provide a range of greyscale values. The light valve array can be a transmissive technology, such as liquid crystal display (LCD) panels in which elements are switched on, off, or a value somewhere between on and off, depending on the amount of light that is required to be transmitted at that pixel location. Alternatively, the light valve array can use a reflective technology such as Liquid Crystal On Silicon (LCOS) or Digital Light Processing (DLP).

Figure 5:
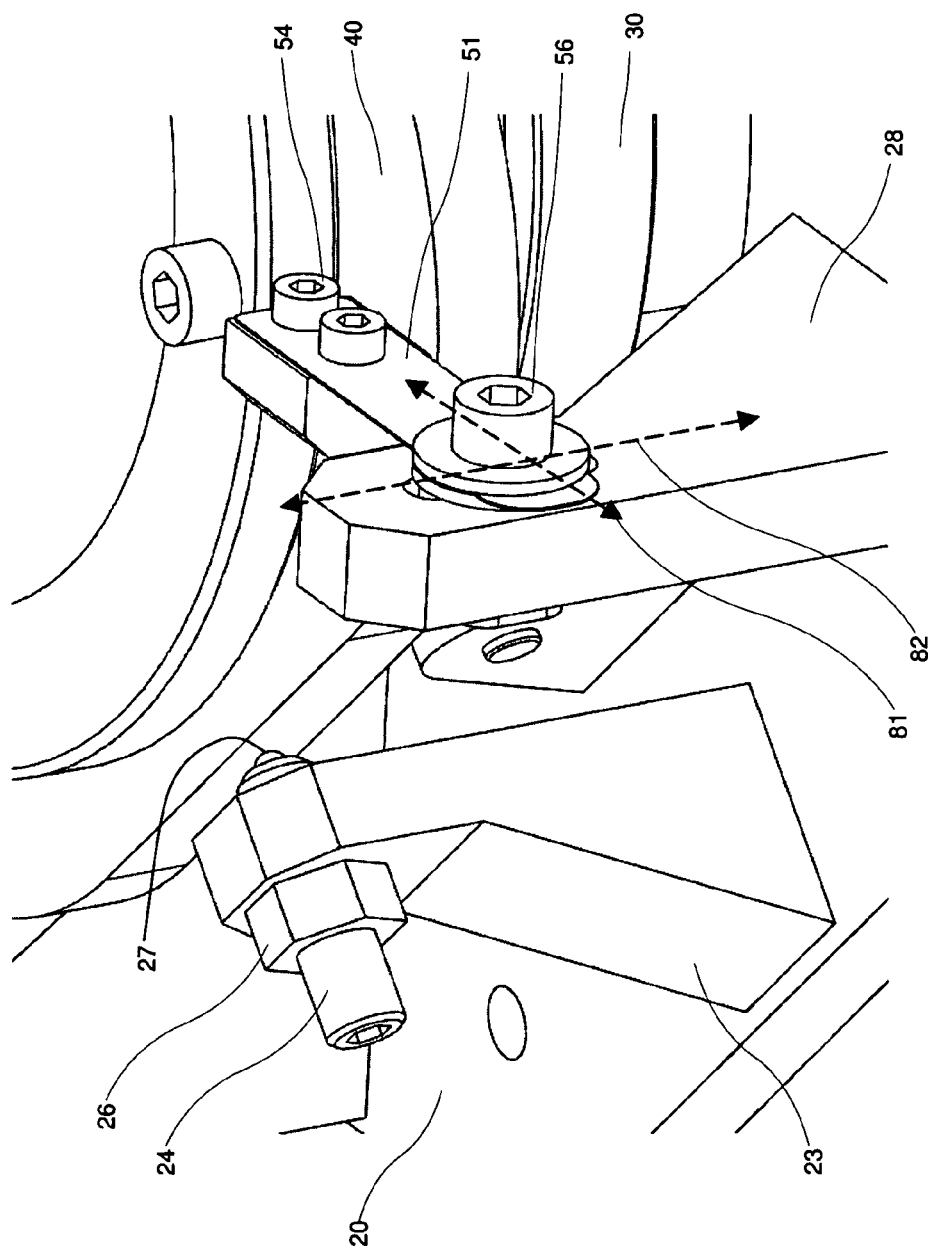
FIG. 5 shows the adjustment mechanism and locking mechanism in detail.
Figure 7:
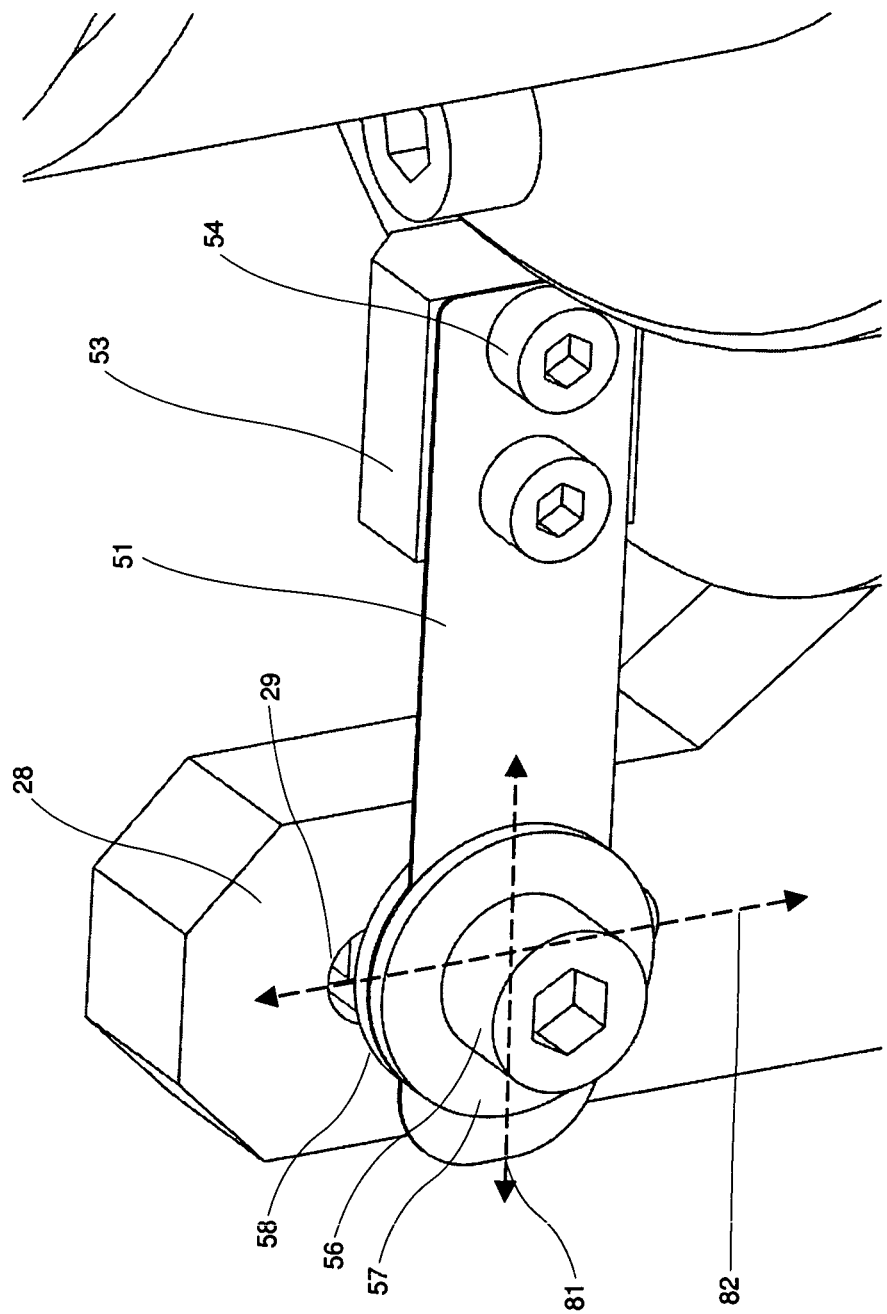

FIG. 4 shows the lens position adjustment system 10 with the optical axis 6 aligned perpendicularly to the plane of the base plate 20. Operation of the adjustment system 10 will now be described with reference to FIGS. 5 to 8. A sequence of steps for adjusting the lens position is:
1. Release the locking mechanism by loosening the locking bolt 56 on each member 51.
2. Loosen the nut 25, 26 of each adjusting screw 22, 24.
3. Adjust Scheimpflug by turning the adjusting screws 22, 24. This causes carrier plate 40 to move relative to the base plate 20. Adjusting screw 22 adjusts position of the carrier plate 40 about the vertical rotation axis 7. Adjusting screw 24 adjusts position of the carrier plate 40 about the horizontal rotation axis 8. One, or both, of the adjusting screws is adjusted depending on what type of Scheimpflug adjustment (horizontal, vertical) is required. During adjustment, members 51 can move relative to supports 58 along axes 81, 82 (FIGS. 5 to 7). Movement of the members 51 is permitted by the slot 52 in each member 51 and by the slot 29 in each support 28. Loosened bolts 56 maintain loose connection between the members 51 and supports 28.

4. Secure the locking mechanism by tightening the locking bolt 56 on each member 51.

The carrier plate 40 is connected at all four 4 corners via the members 51 onto the base plate 20. The carrier plate 40, and hence the projection lens 5, is prevented from any shift-movement in the plane defined by the four locks, which is a plane perpendicular to the optical axis 6. Consequently, a rotation of the carrier plate 40 around the rotation axes 7, 8 is also prevented. Rotation of the carrier plate 40 around the optical axis 6 is also impossible because this is prevented by the connection with the back plate 20 via the connecting part 30 and the axis parts. The same applies for a possible shift along the optical axis 6.

The members 51 can lock the carrier plate 40 at different positions relative to the base plate 20 depending on the Scheimpflug condition. The locking members (e.g. cantilever springs) can twist along their length axis depending on the Scheimpflug condition which is being adjusted.

The centre of gravity of the projection lens 5 does not necessarily lie in the plane of the rotation axes 7, 8. This creates additional load-moments onto the adjustment system 10. To overcome this, the parts of the locking mechanism are positioned (in a plane) at a distance away from the rotation axes 7, 8. The illustrated embodiments use four members 51, which provide a stable and symmetrical arrangement. It is possible to use only three members 51 equally spaced around the carrier plate 40. Alternatively, a larger number of members 51 can be used. For example, four members 51 can be provided at the corners and four members 51 in the middle.

Cantilever springs are advantageously used as members 51 of the locking mechanism. Cantilever springs allow deformations in certain directions, and high stiffness in others. They have a thin cross-section which allows easy deformation in one direction and torsion around the longitudinal axis. At the same time, they exhibit high resistance against deformation along the longitudinal axis, i.e. high resistance against tension & compression loads. The risk of buckling under a compression load is practically impossible because the adjacent spring is loaded with a tension load at the same time. A possible alternative to cantilever springs are small diameter rods or metal stranded cables.

Figure 8:
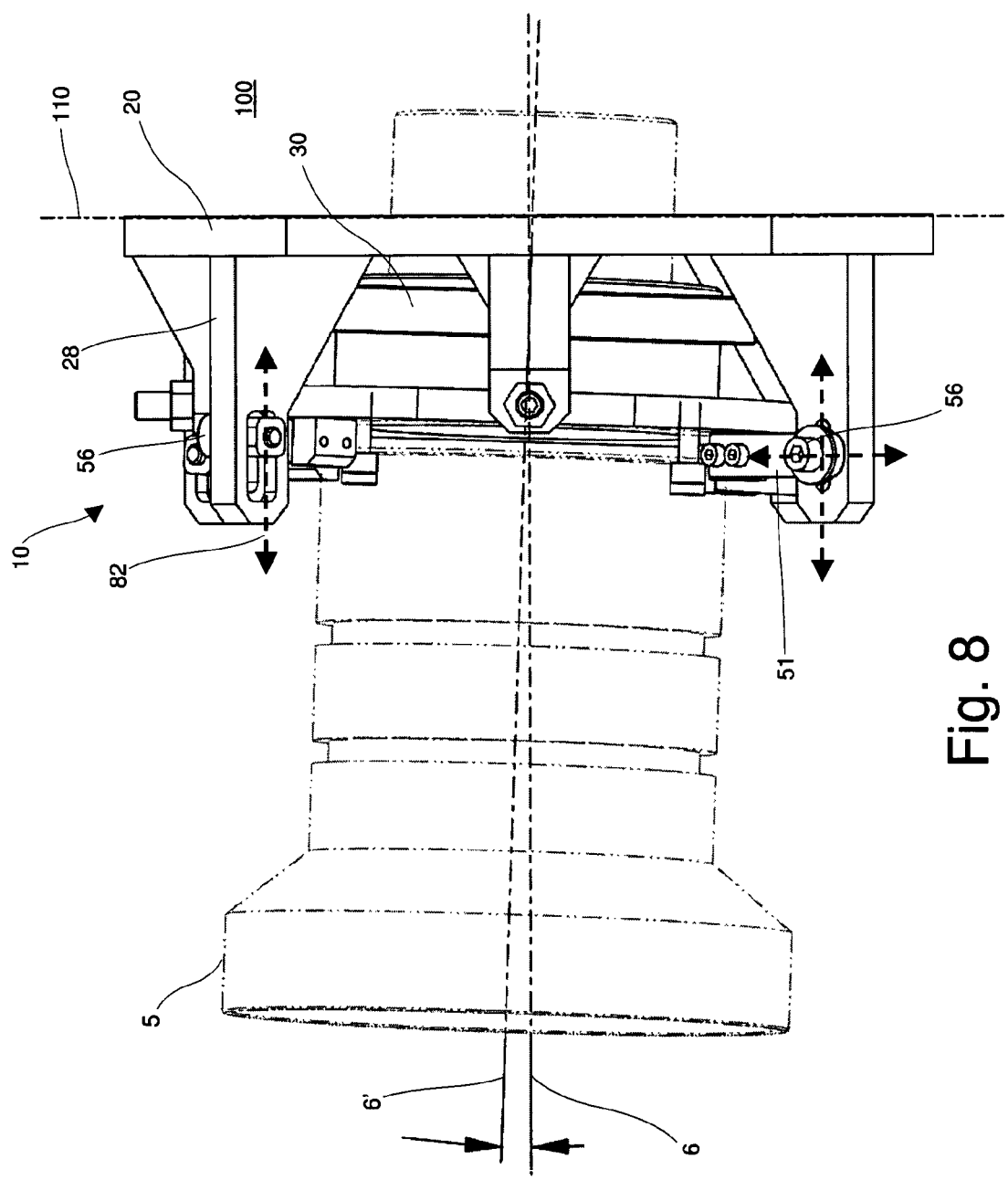
FIG. 8 shows a side view of the lens position adjustment system after making a Scheimpflug adjustment.

FIG. 8 shows the position adjustment system 10 after adjustment of Scheimpflug. The optical axis 6 before adjustment and the optical axis 6' after adjustment are shown. It can be seen, from the position of bolts 56, how the members 51 of the locking mechanism have moved from their nominal positions shown in FIG. 4. Typically, a Scheimpflug adjustment is made at the time of installing the projection system. Providing the relative positions of the projector, projection lens and projection screen do not change, no further adjustment should be required.

Figure 9:
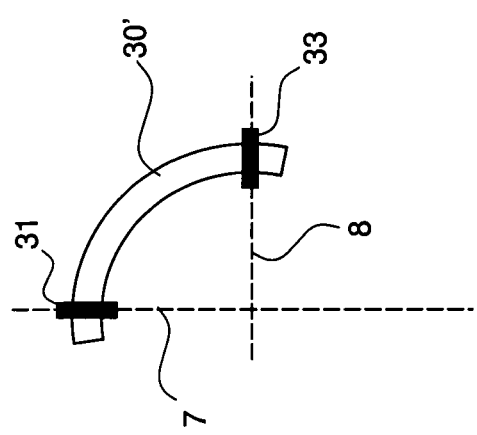
FIG. 9 shows an alternative embodiment of a connecting part for use in the lens position adjustment system.

In the illustrated embodiments, the connecting part 30 is shown as a ring-shaped part with a pair of pivotal mounts 31, 33 for each rotation axis 7, 8. In an alternative embodiment, shown in FIG. 9, the connecting part 30 has a single pivotal mount 32, 34 per rotation axis 7, 8. This permits a connecting part 30' which is a segment of a ring.

Depending on the optical path & lens layout, the size of the connecting part 30 can be modified to allow bigger clear apertures. In the illustrated embodiments, a part of the projection lens 5 is positioned such that it projects through the connecting part 30 (best seen in FIG. 4). Also, a part of the projection lens 5 is positioned such that it projects through the base plate 20 (best seen in FIG. 4).

Connecting part 30 connects to the back plate 20 and carrier plate 40 via axis pieces (31, 33 in FIG. 2). This connection can take place at either side of the connecting part 30, or using a recess in the wall of the ring itself exposing the "axis" pieces.

The positioning of the system chassis mechanics and the carrier plate can be chosen in function of the surrounding mechanics and optical constraints. The back plate/system chassis can be positioned before the connecting part 30 (as shown in the Figures), at the connecting part 30, or after the connecting part 30. The same applies for the carrier plate 40. This allows this concept to be implemented for different kind of projections lenses and optical setups. FIGS. 10A to 13C show some alternative embodiments of the lens position adjustment system.

Figure 10C:
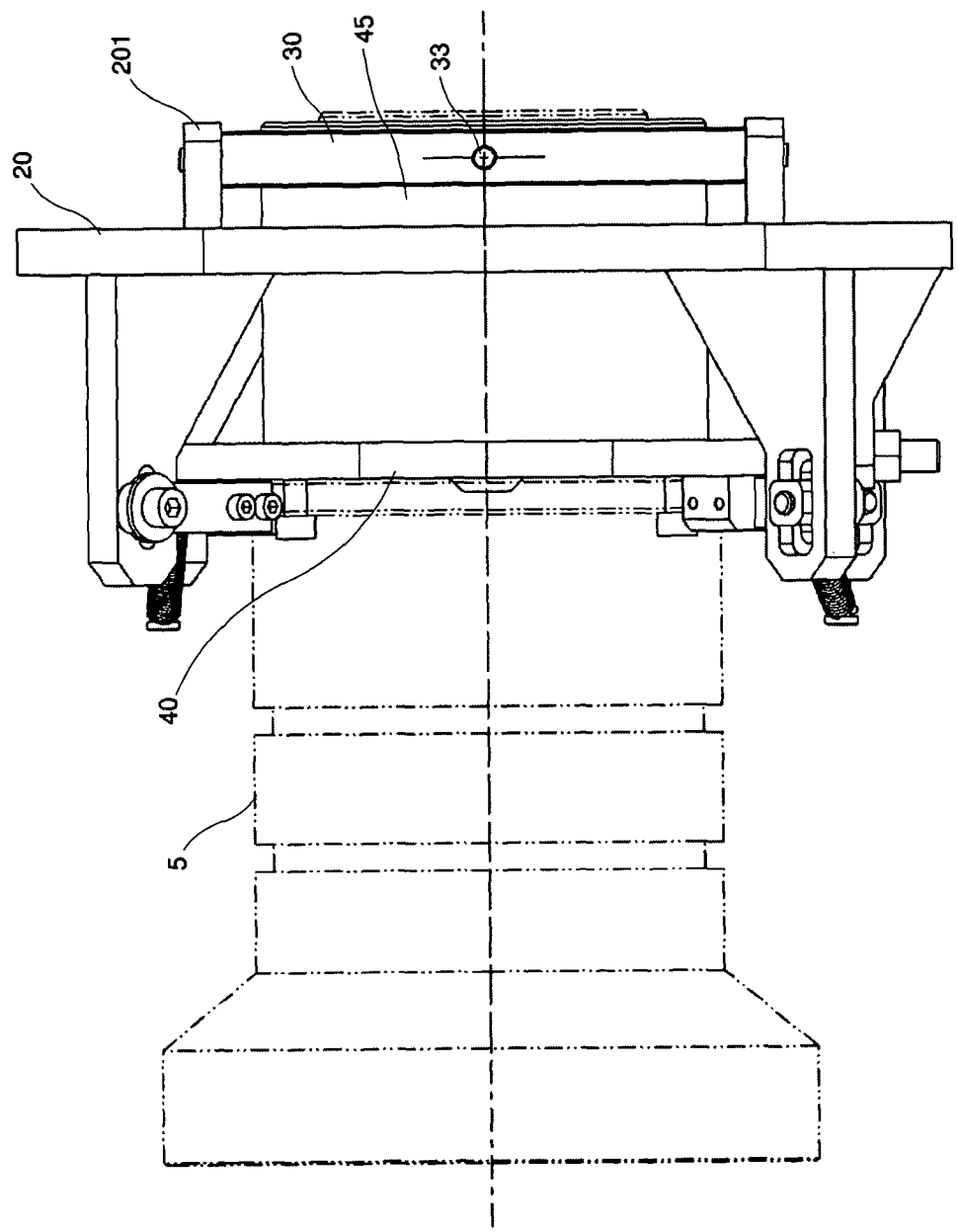

FIGS. 10A to 10C show an alternative positioning of the connecting part 30, carrier plate 40 and back plate 20 with respect to each other, where the connecting part 30 is positioned on the reverse side of the back plate 20, compared to the embodiment shown in FIGS. 1 to 8. The back plate 20 has support arms 201 for pivotally connecting to the connecting part 30. The tubular part 45 of the carrier plate 40 extends rearwardly, and projects through the aperture 19 in the base plate 20. The tubular part 45 is pivotally connected to the connecting part 30 about pins 33.

Figure 11B:
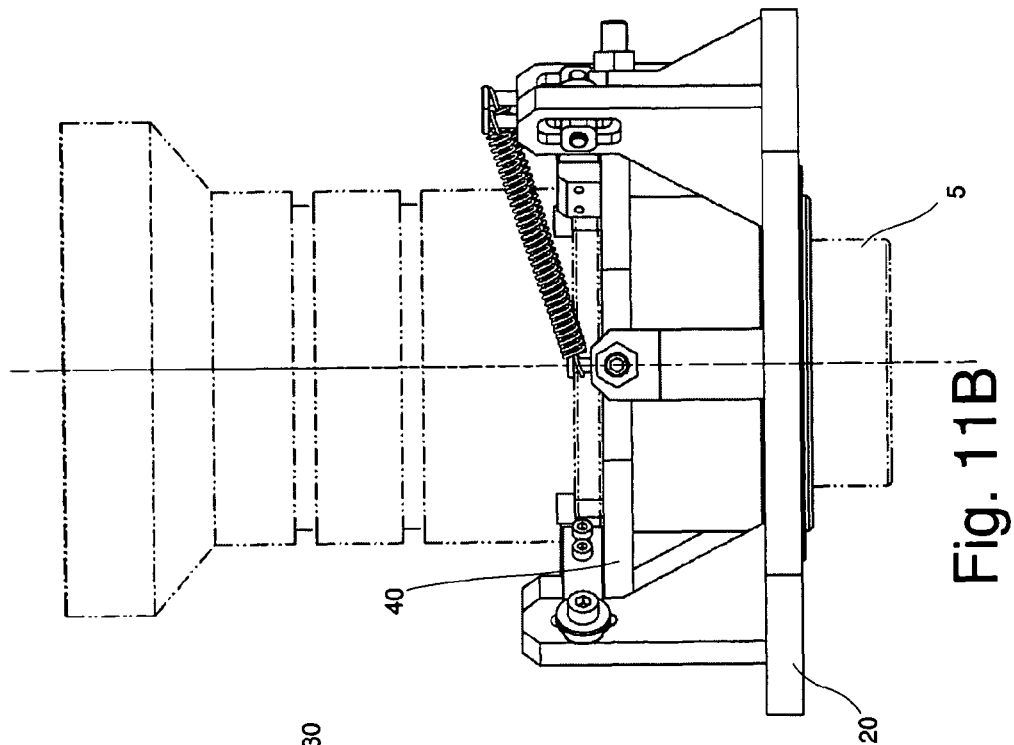
FIGS. 11A to 11C show an embodiment of the lens position adjustment system with the connecting part located in the plane of the back plate.
Figure 11A:
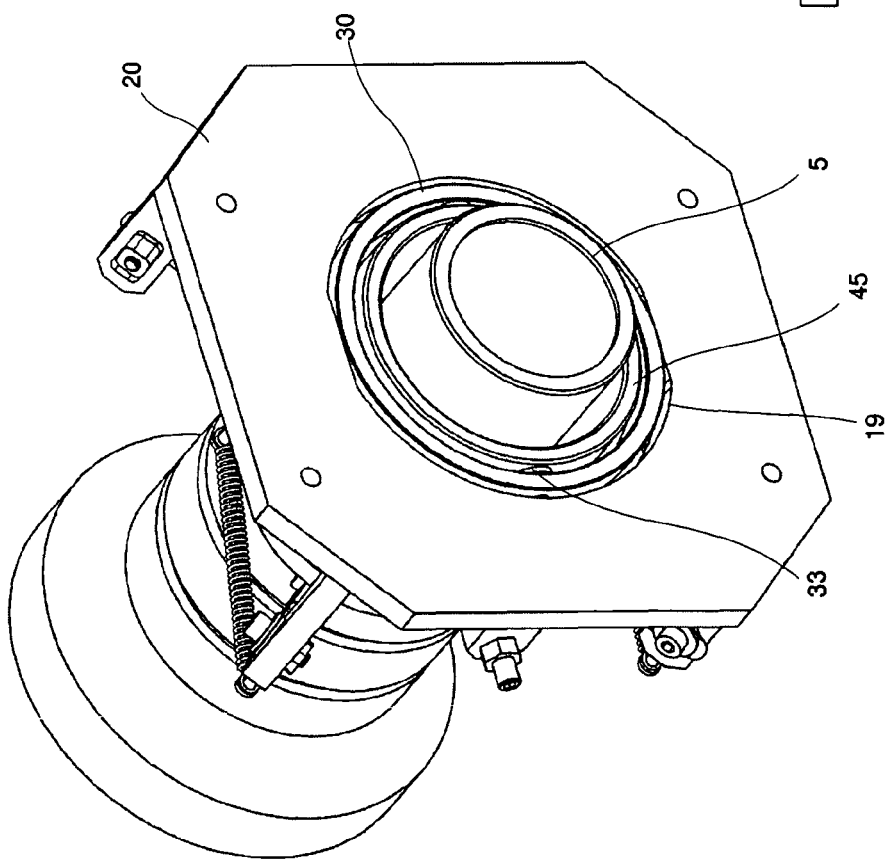
Figure 11C:
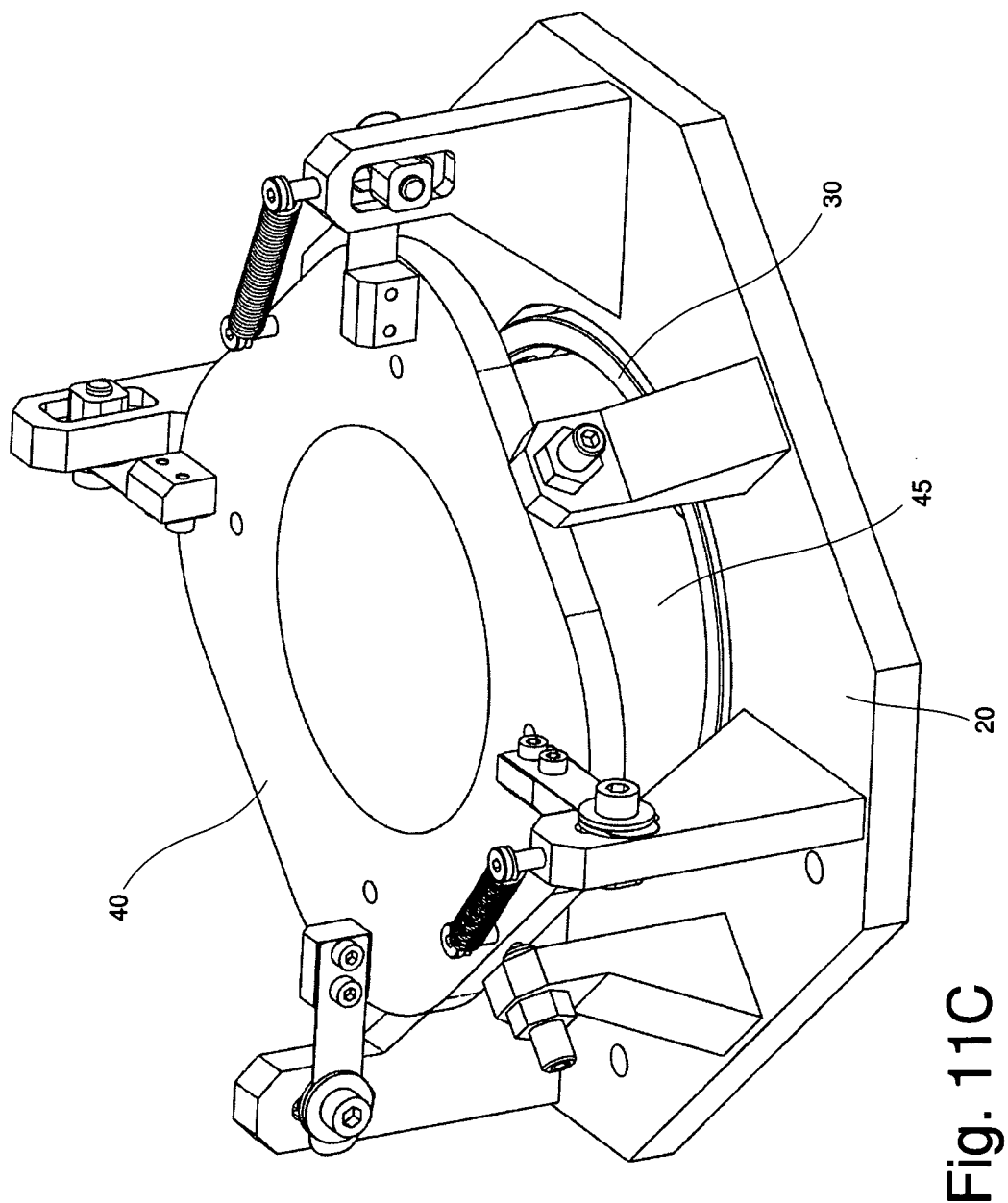

FIGS. 11A to 11C show an alternative positioning of the connecting part 30, carrier plate 40 and back plate 20 with respect to each other, where the connecting part 30 is placed "at" the back plate level, i.e. in the same plane as the back plate 20. The tubular part 45 of the carrier plate 40 extends rearwardly as far as the aperture 19 in the base plate 20. The tubular part 45 is pivotally connected to the connecting part 30 about points 33.

FIGS. 12A and 12B show an alternative positioning of the connecting part 30 where the carrier plate 40 connects to the connecting part 30 using a recess in the wall of the connecting part 30 itself. The back plate 20 has support arms 201 for pivotally connecting to the connecting part 30. The tubular part 45 of the carrier plate 40 extends rearwardly as far as, or just through, the aperture 19 in the base plate 20. The tubular part 45 has a pair of arms 401 which locate in slots 301 in the connecting part. Each arm 401 pivotally connects to the connecting part 30.

Figure 13C:
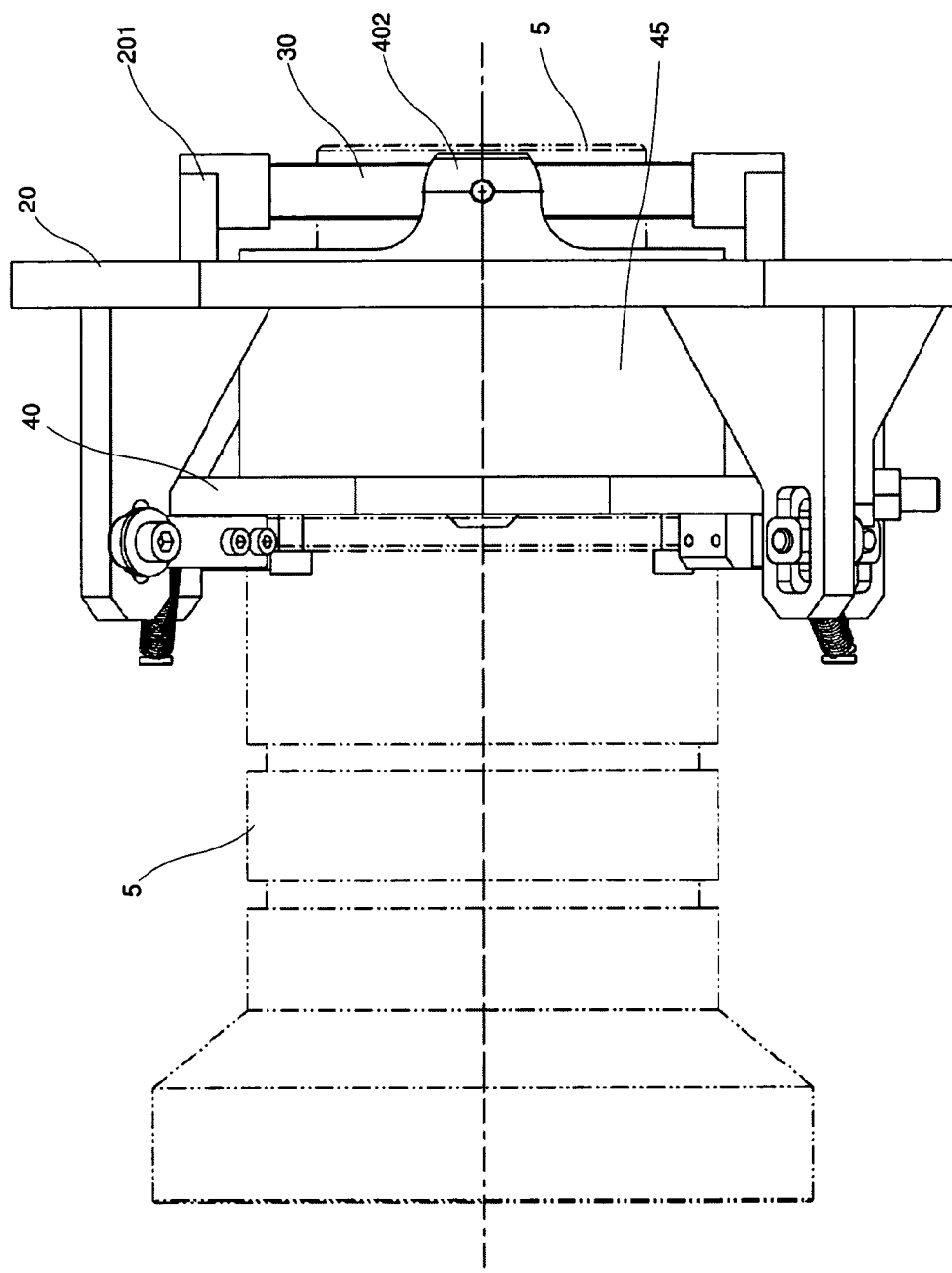

FIGS. 13A to 13C show an alternative positioning of the connecting part 30 where the carrier plate 40 connects to the outside of the connecting part 30. The tubular part 45 of the carrier plate 40 extends rearwardly as far as, or just through, the aperture 19 in the base plate 20. The tubular part 45 has a pair of arms 402 which pivotally connect to the outer face of the connecting part 30.

Other alternative embodiments (not shown) include alternative positioning of the connecting part 30 with respect to the back plate 20. For example, the connection between the back plate 20 and connecting part 30 can be via recesses in the connecting part as an alternative to, a recessed connection between the carrier plate 40 and connecting part 20 shown in FIGS. 12A and 12B. In another alternative embodiment, the connecting part 30 can comprise four recesses for pivotal connections with the carrier plate 40 and back plate 20. Other alternative embodiments are possible. The selection of a particular configuration of the lens adjusting system 10 will be dictated, to some extent, by the particular lens and/or projector.

The following passage describes the advantages of a lens adjustment system according to embodiments of the present invention in terms of making a Scheimpflug adjustment. In order to project an image on a screen that is not parallel to the a projector (e.g. a LCD, LCOS or DLP panel), it is necessary to tilt the projection lens 5 by some angle in such a way that the panel, the projection lens and the screen fulfill the "Scheimpflug" condition. The amount of projection lens tilt that is needed to match a given projection screen angle depends on the screen angle and the magnification (the ratio of the projected image size and the panel size). The relation is straightforward and well documented.

In the case of projection with LCD, LCOS or DLP projectors, the magnification is usually very high (e.g. panel size 20 mm, screen size 2 m, magnification=100), and a very small tilt of the projection lens is sufficient to effect a much bigger tilt of the projection screen.

Depending on the rotation point or axis around which the lens is tilted during the Scheimpflug adjustment, the projected image may shift laterally, and it may be necessary, in the same time or as a separate adjustment, to re-adjust the lateral (X-Y) position of the projection lens to keep the image lateral position unchanged. There is usually one point around which the projection lens may be tilted without inducing a lateral shift of the image. The exact position of this point can be calculated within the approximation of first order (paraxial) optics and is a function of the magnification (again) and of the distance between the two nodal planes (points) of the projection lens. This point is thus not the same for different lenses or different screen sizes, and cannot be defined uniquely for a projector used for different applications. For high magnification applications, this point is usually close to, but not on, the first nodal point of the projection lens, and between the first and second nodal points.

Depending on the rotation point or axis around which the lens is tilted during the Scheimpflug adjustment, the distance between the LCD, LCOS or DLP panel and the projection lens may also change (the lens goes out of focus) and it may be necessary, at the same time or as a separate adjustment, to re-adjust the axial (Z) position of the projection lens to keep the image focus unchanged. Some very small error (e.g. of the order of 0.05 mm) on the axial position of the lens may be acceptable however, as this can be compensated by the focus adjustment of the projection lens itself without noticeable image quality deterioration.

There is one global position of the projection lens with respect to the projector that will match a given screen size, position and tilt, and this can be calculated or simulated with commercial software. A difference between an adjustment system according to embodiments of the invention and other adjustments systems is how many iterations are required to achieve an adjusted projected image. In prior art systems the projection lens is usually mounted on a tilt or Scheimpflug module, which is itself mounted on a X-Y (and eventually Z) module, itself mounted on the projector chassis. This means that the X-Y adjustment of the lens is usually done in a reference system which is fixed to the projector (usually in a plane parallel to the lightvalve) and not in a reference system which is fixed to the projection lens.

A system according to embodiments of the invention locates the rotation point on the optical axis of the projection lens at a position close to (but not on) the first nodal point of the lens where the image shift is less sensitive (but not zero) to the tilting of the lens. As the rotation point is on the optical axis, a small tilt of the projection lens causes only a very small change of the back working distance that does not need to be compensated (this may no longer be the case, however, for low magnification applications, where a larger lens tilt may be needed).

The invention is not limited to the embodiments described herein, which may be modified or varied without departing from the scope of the invention.

The invention claimed is:

1. A lens position adjustment system for adjusting the position of a projection lens relative to a projector for making a Scheimpflug adjustment, the projection lens having an optical axis, the system comprising:
   a first support part for fitting to, or forming part of, the projector;
   a second support part for fitting to, or forming part of, the projection lens;
   a connecting part pivotally connected to the first support part and pivotally connected to the second support part and configured to permit independent adjustment of the second support part relative to the first support part about two axes of rotation which intersect, and are perpendicular to, the optical axis of the projection lens.

2. A system according to claim 1 further comprising a locking mechanism for securing a position of the second support part relative to the first support part.

3. A system according to claim 2 wherein the locking mechanism is arranged to secure the second support part to the first support part.

4. A system according to claim 2 wherein the locking mechanism comprises at least one locking device located at a position which is offset from the axes of rotation.

5. A system according to claim 2 wherein the locking mechanism comprises at least one locking device located at a position which is offset from the optical axis.

6. A system according to claim 2 wherein the locking mechanism comprises a plurality of locking devices positioned around the periphery of the second support part.

7. A system according to claim 6 wherein the locking mechanism comprises at least three, and advantageously at least four, locking devices positioned around the periphery of the second support part.

8. A system according to claim 4 wherein the, or each, locking device comprises an elastically resilient member.

9. A system according to claim 8 wherein the, or each, member is a cantilever spring.

10. A system according to claim 1 further comprising an adjustment mechanism which is arranged to act between the first support part and the second support part.

11. A system according to claim 10 wherein the adjustment mechanism comprises an adjustment mechanism for adjustment of the second support part relative to the first support part about a first of the axes of rotation and an adjustment mechanism for adjustment of the second support part relative to the first support part about a second of the axes of rotation.

12. A system according to claim 11 wherein the adjustment mechanism comprises an adjustment mechanism for adjustment of the second support part relative to the first support part in a first direction of rotation about a first axis of rotation, the system further comprising a member for exerting a force on the second support part in a second, opposite, direction of rotation about the first axis of rotation.

13. A system according to claim 11 wherein the first axis of rotation is a vertical axis and the second axis of rotation is a horizontal axis.

14. A projector including the lens position adjustment according to claim 1.

* * * * *